United States Patent [19]

Gambardella

[11] Patent Number: 5,711,261
[45] Date of Patent: Jan. 27, 1998

[54] INTAKE SYSTEM FOR V-TYPE ENGINE

[76] Inventor: C. Bruce Gambardella, 199 McNamara Rd., Spring Valley, N.Y. 10977

[21] Appl. No.: 705,607

[22] Filed: Aug. 30, 1996

Related U.S. Application Data

[63] Continuation-in-part of Ser. No. 456,144, May 31, 1995, Pat. No. 5,551,386.

[51] Int. Cl.$^6$ .................................................. F02M 35/10
[52] U.S. Cl. .............................. 123/184.35; 123/184.53
[58] Field of Search ........................... 123/184.53, 184.55, 123/184.47, 184.42, 184.34, 184.35

[56] References Cited

U.S. PATENT DOCUMENTS

| | | | |
|---|---|---|---|
| 2,916,027 | 12/1959 | Chayne et al. | 123/184.35 |
| 2,947,294 | 8/1960 | Bird et al. | 123/184.35 |
| 4,577,596 | 3/1986 | Senga | 123/184.31 |
| 4,641,610 | 2/1987 | Rutschmann | 123/184.36 |
| 4,741,295 | 5/1988 | Hosoya et al. | 123/568 |
| 4,766,853 | 8/1988 | Iwanami | 123/184.36 |
| 4,809,647 | 3/1989 | Masumoto et al. | 123/184.36 |
| 4,930,468 | 6/1990 | Stockhausen | 123/308 |
| 4,957,071 | 9/1990 | Matsuo et al. | 123/184.36 |
| 4,962,735 | 10/1990 | Andreas | 123/184.31 |
| 5,000,129 | 3/1991 | Fukada et al. | 123/184.36 |
| 5,005,536 | 4/1991 | Susuki et al. | 123/184.35 |
| 5,063,885 | 11/1991 | Yoshioka | 123/184.34 |
| 5,092,285 | 3/1992 | Beaber | 123/184.34 |
| 5,211,139 | 5/1993 | Houle et al. | 123/184.47 |
| 5,551,386 | 9/1996 | Gambardella | 123/184.35 |

FOREIGN PATENT DOCUMENTS

| | | | |
|---|---|---|---|
| 3-88913 | 4/1991 | Japan | 123/184.34 |
| 5-86910 | 4/1993 | Japan | 123/184.21 |

*Primary Examiner*—David A. Okonsky
*Attorney, Agent, or Firm*—Weingram & Associates, P.C.

[57] ABSTRACT

An inlet manifold system particularly adapted for a "V-8" to "V-16" Type internal combustion engine. Such an engine has a first and a second bank of cylinders.

First and second elongated secondary manifolds disposed substantially parallel to and above the respective bank of cylinders;

A plurality of substantially parallel, spaced apart, demand runners joined to each respective secondary manifold along its length, each demand runner extending from the secondary manifold to a cylinder in the opposite bank of cylinders and in fluid connection with the secondary manifold and the cylinder.

A plurality of substantially parallel, spaced apart, supply runners joined to each respective secondary manifold along its length and in fluid connection therewith.

The demand runners and the supply runners are connected to the secondary manifolds such that each pair of adjacent spaced apart demand runners has an supply runner therebetween. Another embodiment of the present invention provides for segmenting the secondary manifolds with flapper valves pivotally mounted in the plenum to dedicate a supply runner with a specific demand runner, the result of which is an increase in length of the overall runner to produce an increase in low end torque when an engine operates at relatively low rpms.

7 Claims, 7 Drawing Sheets

FIG. 7

INTAKE SYSTEM FOR V-TYPE ENGINE

This application is a continuation-in-part of application number 08/456,144 filed on May 31, 1995 and now U.S. Pat. No. 5,551,386.

BACKGROUND OF THE INVENTION

1. Field of the Invention

This invention relates to fuel injection intake manifold systems. In particular, this invention relates to a manifold system having reduced external dimensions in which sequentially firing cylinders are supplied with sufficient, uniform air flow for uniform and high power output.

2. Description of the Prior Art

The present invention relates to an improvement in the intake manifold structure for a V-Type internal combustion engine. A typical V-Type internal combustion engine has two banks of cylinders, one on the left and one on the right. Typically, to make the engine compact, an intake manifold for distributing air among the respective cylinders is interposed between the left and right cylinder banks. Engine performance can be improved by using the inertia of the intake air entering the engine and minimizing resistance to flow of such intake air. This can be done with an intake manifold with air passages of sufficient lengths and effective areas to optimize the performance of the engine. As engines have decreased in size due to space and weight considerations, difficulties have arisen in maintaining the requisite lengths and effective areas to optimize the engine's performance.

Additionally, fuel injected V-8 engines characteristically fire cylinders sequentially. No matter which firing order is chosen, at least one, and possibly two pairs of adjacent cylinders will always fire sequentially. These sequentially firing cylinders demand air sequentially. A problem exists in providing air to these adjacent sequentially firing cylinders. These cylinders compete for the air supply and "starve" each other. This causes non-uniform flow to the cylinders resulting in non-uniform power output.

Still further, it has been found that having demand runners, tubes, i.e., "ram pipes" draw air from a common plenum chamber with a throttled supply is more beneficial than throttling each demand runner. However, since some cylinders in the engine have intake strokes that overlap the intake strokes of other cylinders, if all of the cylinders are drawing from a common plenum chamber, the charging of one cylinder will interfere with the charging of another cylinder, thereby decreasing the volumetric efficiency and preventing uniform charging. To solve this problem, various types of manifold systems were developed. Such systems however did not resolve or even alleviate the problem.

Additionally, with the decreasing size of automobiles, lower hood line designs and lower frontal areas there is a need for a compact fuel injection manifold having a low hood profile. Many known fuel injection manifolds, to achieve such low hood profile limitations have serviceability problems, i.e., parts are difficult to replace. In particular, to make repairs on the engine the intake manifold must be removed to obtain access to, for example the valve covers or remove the fuel injectors. For example, the standard Ford manifold prevents removal of the valve cover and the injectors. Further, the valve cover cannot be removed until the throttle body and EGR valve is removed. To achieve such low profiles, the manifolds and plenums must have sharp turns and curves to provide sufficient length. Such a configuration causes higher pressure drops and decreased flows when compared to higher profile manifolds with "gentler" turns and curves.

Still further, it is known, for example, that it is an advantage to having air demand tubes to the cylinders tapered. This allows for higher and more uniform air flows through the engine. It is also advantageous for today's high RPM engines to have long, i.e., about eighteen inches long, demand runners to the cylinders. Providing such configurations with known manifold systems without having sharp bends is almost impossible and snaking them back and forth across the engine causes high pressure drops and low flows.

Other modifications can be made to manifolds which will enhance the performance of engines. So, for example, it is found that being able to vary the length of the path of flow of air from the inlet of the engine to the cylinder will effect the performance of the engine. There is a long history of tuning inlet manifolds to achieve maximum engine performance. A problem with such a tuning arrangement often is the tuning is designed for a particular spot on the performance envelope of the engine or a specific performance configuration of engine rpm. It is desirable to be able to adjust the manifold configuration to optimize or improve performance of the engine at more than one particular point and over as large a range as possible. Alternatively, it would be desirable to have the manifold adjustable for operations at the high end operation or high rpm operation of the engine and also at the low end operation or low rpm operation of the engine.

Possibly relevant U.S. Patents in this area of technology are:

U.S. Pat. No. 2,916,027 to Chayne et al.
U.S. Pat. No. 2,947,294 to Bird et al.
U.S. Pat. No. 4,577,596 to Senga
U.S. Pat. No. 4,741,295 to Hosoya et al.
U.S. Pat. No. 4,930,468 to Stockhausen
U.S. Pat. No. 4,957,071 to Matsuo et al.
U.S. Pat. No. 4,962,735 to Andreas
U.S. Pat. No. 5,000,129 to Fukada et al.
U.S. Pat. No. 5,005,536 to Suzuki et al.
U.S. Pat. No. 5,063,885 to Yoshioka U.S. Pat. No. 2,916,027 to Chayne et al. describes an induction system for an internal combustion engine. The system includes longitudinal arms disposed above and parallel to the cylinder blocks. A plurality of substantially identical ram pipes interconnect the arms to the cylinders for supplying a charge thereto. The ram pipes lead from the arm to the opposing bank of cylinders. A filtering device is provided in the central plenum to aid in silencing the acoustic noise developed in a resonant tuned system. There is no teaching or suggestion of balancing the flow between the various ram pipes, other than by adjustment of the volume of the arms (49, 50 of FIG. 2, thereof) from which the ram pipes extend, and adjustment of the volume of the header duct (46 of FIG. 2, thereof).

U.S. Pat. No. 2,947,294 to Bird et al. describes an intake manifold for an internal combustion engine in which the ram pipes are arranged in groups of cylinders (e.g., one group of cylinders 1,4,6 and 7 and another group of cylinders 2,3,5 and 8), with the cylinders in a common group having the least amount of overlapping of the intake strokes. By a careful selection of the cylinders that comprise each group, there is a minimum amount of overlapping of the charging cycle or the intake strokes of the cylinders charged through a common chamber.

U.S. Pat. No. 4,577,596 to Senna describes an intake manifold for a V-Type internal combustion engine with supply tubes in the shape of a horseshoe. Branch tubes are integrally formed with the supply runner to provide communication between the supply runner and the cylinder intake port. Fuel injection nozzle mounting holes are formed in the branch tubes at a point just above each cylinder intake port. This design does not address the issue of adjacent drawing cylinders overlapping on the charging cycle and the problems associated therewith.

U.S. Pat. No. 4,741,295 to Hosoya et al. describes an intake manifold system for a V-Type multiple cylinder engine that can be accommodated within a gap defined between the two cylinder banks of the engine in a highly compact manner. The system does not address the issue of adjacent drawing cylinders overlapping on the charging cycle and the problems associated therewith.

U.S. Pat. No. 4,930,468 to Stockhousen describes an induction system for a multi-cylinder internal combustion engine. This reference does not teach an intake manifold system or address the issue of adjacent drawing cylinders overlapping on the charging cycle and the problems associated therewith.

U.S. Pat. No. 4,957,071 to Matsuo et al. describes an intake system for a V-Type internal combustion engine having two banks of cylinders. The intake system is comprised of two subcollectors disposed above the respective two banks of cylinders and connected with the cylinders in the banks. The main collector is disposed above, and between, the two banks of cylinders and is connected through a throttle with the two sub-collectors. Generally, the system is a cross ram design with a central supply plenum with a single split balance tube connecting the two runner supply plenums. The system does not address the issue of adjacent drawing cylinders overlapping on the charging cycle and the problems associated therewith. Further, the system overhangs both the front and rear of the engine and the valve covers, poorly uses engine compartment space and has poor serviceability.

U.S. Pat. No. 4,962,735 to Andreas describes an intake system for multi-cylinder internal combustion engines. The system has suction pipes that extend in a longitudinal direction and are connected to the intake channel leading toward the intake valve by means of passages of different lengths. The system uses a dual supply plenum. A control element is provided for selectively activating one of the two flow paths. The design is essentially another approach to variable inlet tuning, e.g., sees U.S. Pat. No. 4,930,468 to Stockhousen. Due to the complexity of the system, a great deal of under hood space is utilized and serviceability is poor. This system does not address the issue of adjacent drawing cylinders overlapping on the charging cycle and the problems associated therewith.

U.S. Pat. No. 5,000,129 to Fukada et al. describes an intake system for a V-Type engine having a plurality of cylinders disposed in each of left and right-hand cylinder banks with a central surge tank disposed above the space between the left and right cylinder banks. Left and right surge tanks are respectively disposed above the left and right cylinder banks. Communicating passages connect the central surge tank with the left and right surge tanks, and discrete intake passages connect the left and right surge tanks with the cylinder. At least one of the communicating passages on each side of the central surge tank is disposed between the discrete intake passages on the side of the central surge tank. This system provides an intake system in which the effective volume of the surge tank can be increased without substantially increasing the overall size of the engine. This system does not address the issue of adjacent drawing cylinders overlapping on the charging cycle and the problems associated therewith.

U.S. Pat. No. 5,005,536 to Suzuki et al. describes two embodiments of compact high performance induction systems for V-Type engines that include pairs of plenum chambers that extend over the respective cylinder banks. First pairs of runners extend from an inlet opening in each plenum chamber to an outlet opening that communicates with the cylinder of the opposite bank. Second pairs of intake passages are provided which extend from inlet openings in the respective plenum chambers to outlet openings in the cylinders of the adjacent cylinder head. The first intake passages have portions that extend through the other plenum chambers and the second intake passages communicate with the cylinders through these intermediate portions. The intermediate portions are curved and in one embodiment the second intake passages are tangential to these curved portions and in the other embodiment they are radial to it. Each cylinder of the engine is thus served by both long low speed runners and short high speed runners. This system does not address the issue of adjacent drawing cylinders overlapping on the charging cycle and the problems associated therewith.

U.S. Pat. No. 5,063,885 to Yoshioka describes an improved high efficiency compact induction system for a V-Type internal combustion engine. The system includes a plenum chamber that extends through the center of the engine and a plurality of intake pipes that extend from the intake ports of the cylinders of one of the banks, across the center that enters the plenum chamber adjacent the intake ports of the other cylinder across the center and enter the plenum chamber on the side adjacent the intake ports of the one cylinder bank. The points of entry of the intake pipes with the plenum chamber lie under the other intake pipes to provide adequate length for the intake pipes and maintain a short overall length for the induction system. This system permits packaging long inlet runners by using the space in the center of the banks of cylinders. There would be significant problems in using this system in a "push rod" engine as the cam and push rods use considerable space in such area. This system does not address the issue of adjacent drawing cylinders overlapping on the charging cycle and the problems associated therewith.

The above known systems, to various degrees, provide very poor serviceability, are extremely complex designs and do not address the problem of adjacent demanding cylinders. Further, they allow relatively little space or latitude for demand runner taper. Runner taper greatly enhances cylinder filling, volumetric efficiency, and power output.

OBJECTS AND SUMMARY OF INVENTION

It is an object of this invention to provide a manifold design for a fuel injected engine in which a separate air supply is interspersed between cylinders that are firing and demanding air sequentially to eliminate cylinder competition for air.

It is a further object of this invention to provide a compact fuel injection manifold with a low hood profile that can be easily serviced.

It is a more specific object of this invention to provide a compact fuel injection manifold in which the intake manifold does not have to be removed to obtain access to, for example, the valve covers or fuel injectors.

It is another object of this invention to provide a manifold configuration that permits relatively long, tapered air demand runners to the cylinders to provide higher and more uniform air flow through the engine.

It is yet another object of this invention to provide a manifold that allows for variation of demand runner taper or area and is of a size that fits within the overall length and width of the engine compartment and maintains a low hood profile.

All of the afordescribed objects are achieved by the inlet manifold system of this invention. The system is particularly adapted for a "V-8" to "V-16" Type internal combustion engine. Such an engine has a first and a second bank of cylinders, each bank having a plurality of combustion cylinders, the banks being parallel to each other. The manifold comprises:

a] a first elongated secondary manifold disposed substantially parallel to and above the first bank of cylinders;

b] a second elongated secondary manifold disposed substantially parallel to and above the second bank of cylinders;

c] a first set of a plurality of substantially parallel, spaced apart, demand runners joined to the first secondary manifold along its length, each demand runner extending from the first secondary manifold to a cylinder in the second bank of cylinders and in fluid connection with the first secondary manifold and the cylinder;

d] a second set of a plurality of substantially parallel, spaced apart, demand runners joined to the second secondary manifold along its length, each demand runner extending from the second secondary manifold to a cylinder in the first bank of cylinders and in fluid connection with the second secondary manifold and the cylinder;

e] a first set of a plurality of substantially parallel, spaced apart, supply runners joined to the first secondary manifold along its length and in fluid connection therewith; and f] a second set of a plurality of substantially parallel, spaced apart, supply runners joined to the second secondary manifold along its length and in fluid connection therewith.

The demand runners and the supply runners are connected to the first and second secondary manifolds such that each pair of adjacent spaced apart demand runners has a supply runner therebetween.

Preferably, the demand runners and the supply runners are connected to the first and second secondary manifolds such that each pair of adjacent spaced apart supply runners has a demand runner therebetween.

In a preferred embodiment, a primary manifold is disposed between and parallel to the first and second secondary manifolds and in fluid connection with each set of supply runners. The supply runners extend from the primary manifold and are substantially perpendicular thereto. The primary manifold has an air inlet port at one end thereof, i.e., the front of the automobile, with a throttle thereon.

The manifold of this invention distributes air to the cylinders of a V-8 to V-16 engine in an efficient manner. The air is channeled down through the center of the engine through a central chamber, i.e., the primary manifold. When air is drawn by a cylinder in a bank, the air flow is pulled from two different "runners" or channels, i.e., the demand runner and a supply runner, thus enhancing the flow of air and minimizing competition for air from adjacent cylinders. The plenum, manifolds, and runners, are configured to form a low profile that provides easy access for servicing.

In another embodiment of the invention, a plenum disposed between the supply runners and the demand runners can be segmented by valve means so as to dedicate individual supply runners to individual specific demand runners, or to allow the plenum to intermix air from the various supply runners to the various demand runners. By being able to segment the plenum to dedicate the connection between a specific supply runner and a specific demand runner, there is in effect produced a variation in the length of the demand runner to effect the characteristics of the manifold and thereby influence the efficiency of the engine at different operating speeds. Normally the lengthening of the demand runner increases engine performance at low rpm. Further, the variation in the configuration of the plenum and the resulting configuration of the supply and demand runners can be set for actuation upon given conditions controlled by the operator of the automobile as, for example, the plenum could be adjusted to an unrestricted state as engine rpm rises above a given level. Additionally, as the rpm falls, the relatively open plenum could then be resegmented in accordance with the falling engine rpm.

Accordingly, it is a further object of the present invention to provide a manifold for internal combustion in automobile engines which can change the configuration of the plenum from an open to a segmented configuration between the supply and demand runners.

Another object of the present invention is to provide a manifold for an internal combustion engine in which the plenum can be intermittently segmented to dedicate flow from a specific supply runner to a specific demand runner.

Still another object of the present invention is to provide a manifold for internal combustion engines in which the effective length of the demand runners can be effectively varied.

Yet another object of the present invention is to provide a manifold for internal combustion engines in which the effective length of the demand runners can be effectively varied by coordinating flow between the specific demand runners and specific supply runners coacting through a common plenum.

Yet another object of the present invention is to provide a manifold for internal combustion engines which can vary the effective taper of the demand runner.

Still another object of the present invention is to provide a manifold for internal combustion engines which can vary the effective taper of the supply runner by means of coaction with a valving mechanism between supply runners and demand runners operating from a common plenum.

Yet another object of the present invention is to provide a manifold for internal combustion engines which can impose a segmented condition in a plenum between the supply runners and demand runners.

A further object of the present invention is to provide a manifold for a multi-cylinder internal combustion engine in which the plenum between the multiple supply runners and the multiple demand runners providing air to the cylinders can be altered temporarily in response to the desire of the operator of the engine and/or in response to preset operating parameters of the engine.

A further object of the present invention is to provide a manifold for a multi-cylinder internal combustion, engine in which the configuration of the plenum can be altered intermittently or non-permanently or temporarily at the desire of the operator of the engine or in response to performance criteria of the engine and such changes in the configuration of the plenum occur by means of external actuating means.

Still a further object of the present invention is to provide a manifold for a multi-cylinder internal combustion engine in which the configuration of the plenum between the supply and demand runners can be altered to increase performance at the low end of engine operation.

Yet another object of the present invention is to provide a manifold for a multi-cylinder internal combustion engine in which the configuration of the plenum can be modified to increase performance of the engine at the high end of engine operation.

Yet another object of the present invention is to provide a manifold for a multi-cylinder internal combustion engine having a plenum disposed between the supply and demand runners which provides different configurations for the combination of runners at the high end and at the low end of engine operations.

Yet another object of the present invention is a manifold for a multi-cylinder internal combustion engine in which the plenum coacting between the supply runners and the demand runners can adjust its configuration to achieve maximum engine performance at the high end operation of the engine and at the low end operation of the engine.

These and other advantages are obtained by means of a manifold having a plenum disposed between the supply runners and the demand runners. Flap valves disposed in the plenum are seated to isolate each adjoining pair of supply and demand runners in the plenum. The flap valves are pivoted to lay in the maximum closed position so as to isolate the adjacent pairs of supply and demand runners, and effectively segment the plenum into sections comprising a supply and a demand runner. Actuating means extend from the flap valves to outside the plenum and can be actuated by a convenient actuating means. At high operations, the flap valves are rotated out of engagement allowing communication between all portions of the plenum to make the plenum operate as a unitary whole. At low rpm the flap valves are positioned in the closed position isolating individual adjacent supply and demand runners to effectively segment the plenum and form an effective demand runner composed of the supply and the demand runner.

BRIEF DESCRIPTION OF THE DRAWINGS

Other important objects and features of the invention will be apparent from the following Detailed Description of the Invention taken with the accompanying drawings in which.

DETAILED DESCRIPTION OF THE INVENTION

Figure 1:
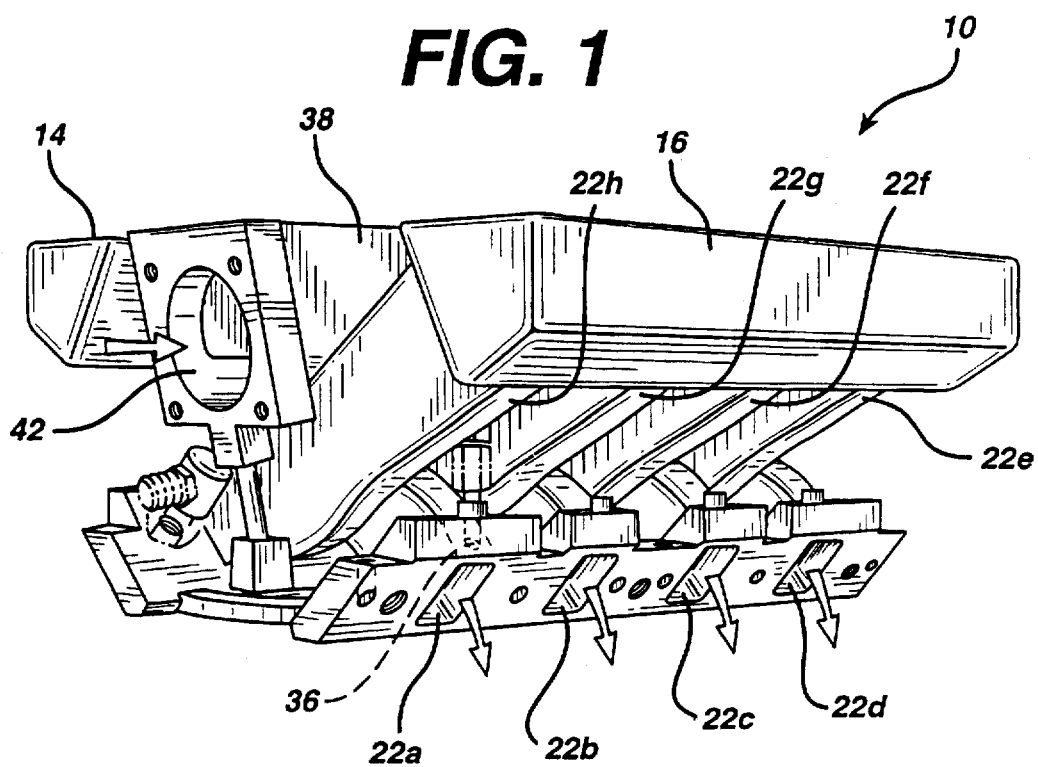
FIG. 1 is a front-side perspective of an embodiment of the manifold of this invention.
Figure 2:
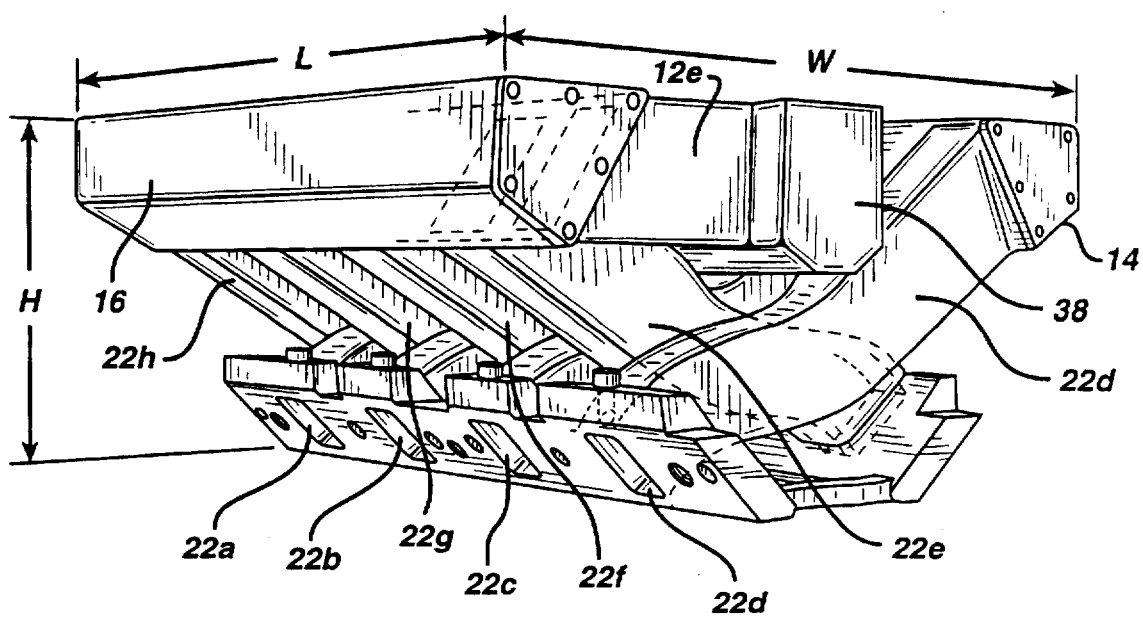
FIG. 2 is a rear-side perspective of the embodiment of the manifold depicted in FIG. 1.

Referring to the drawings in more detail, the manifold 10 of this invention is used with a multicylinder combustion engine 40. The inlet manifold system of this invention 10 may be used on any type engine, but is particularly adapted for a "V-8" to "V-16" Type internal combustion engine 40. Such an engine 40 has a first bank 18 and a second bank 20 of a plurality of combustion cylinders 26. The banks 18, 20 are substantially parallel to each other.

Figure 3:
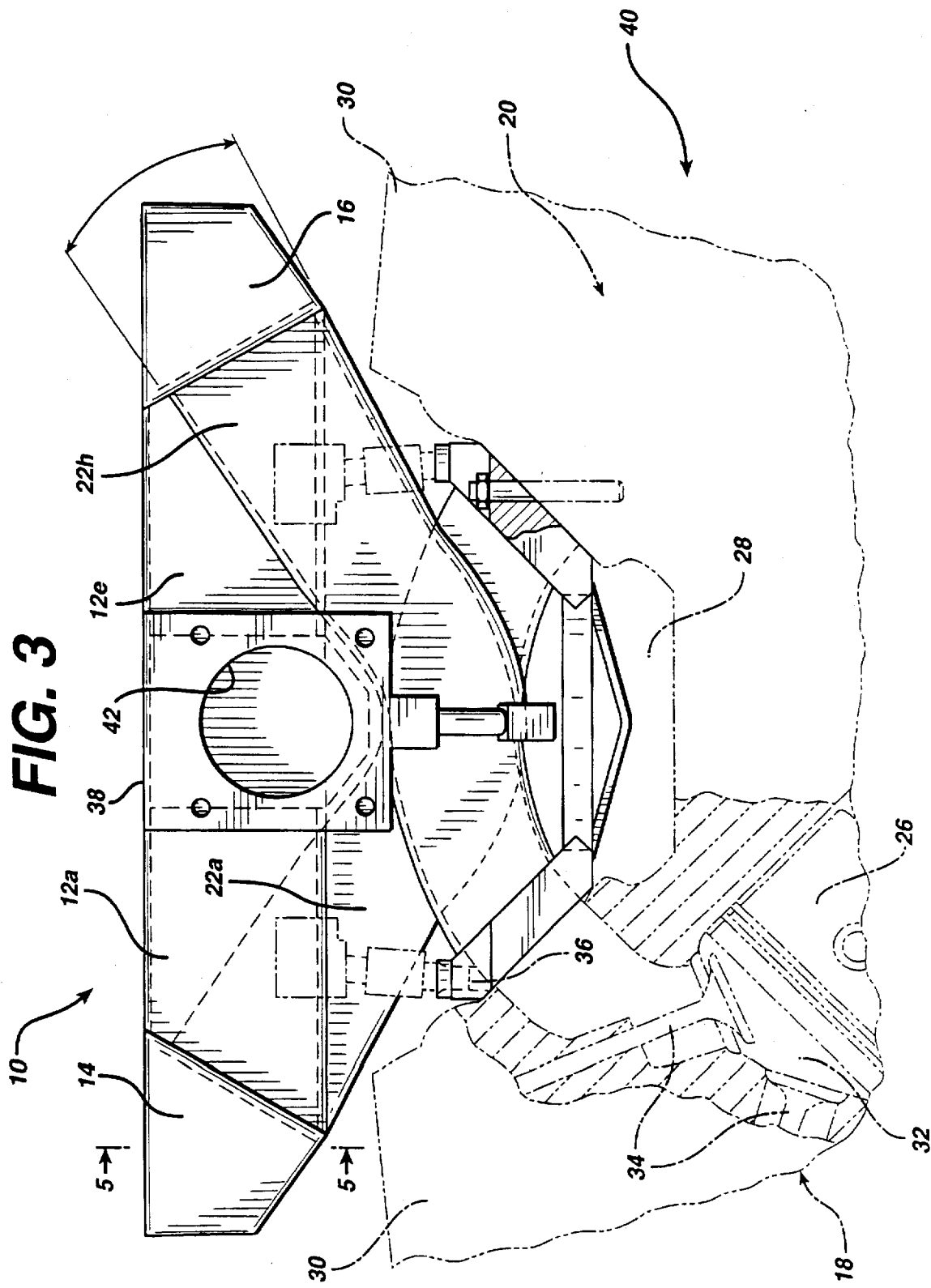
FIG. 3 is a front view of the embodiment of the manifold depicted in FIG. 1 showing it mounted to an engine.

Referring to FIG. 3, the engine 40 includes a cylinder block 24 having a pair of angularly disposed banks 18,20 of cylinders 26 with an upwardly opening space 28 therebetween. Separate cylinder heads 30 are secured to each cylinder bank 18,20 to close the upper ends of the cylinders 26. These heads 30 include cavities therein positioned to register with the ends of the cylinders to form combustion chambers 32. Intake valves 34 control the admission of the gasoline charge into the combustion chambers 32.

To form a combustible charge of air and fuel, a fuel injection system of the type that is well known in the art is used. Such a system is responsive to the amount of air flowing into the engine and is adapted to inject metered fuel into the air by means of fuel injection nozzles 36 (a–h) located at the ends of the demand runners 22 and aimed at intake valves 34. The manifold system of this invention is particularly adapted to a fuel injection system vis-a-vis a carbureted system.

A first elongated secondary manifold 14 is disposed above and substantially parallel to the first bank 18 of cylinders. A second elongated secondary manifold 16 is disposed above and substantially parallel to and above the second bank 20 of cylinders. The secondary manifolds 14,16 are preferably hollow plenum chambers that permit the unobstructed flow of air and are of equal size and volume.

Figure 4:
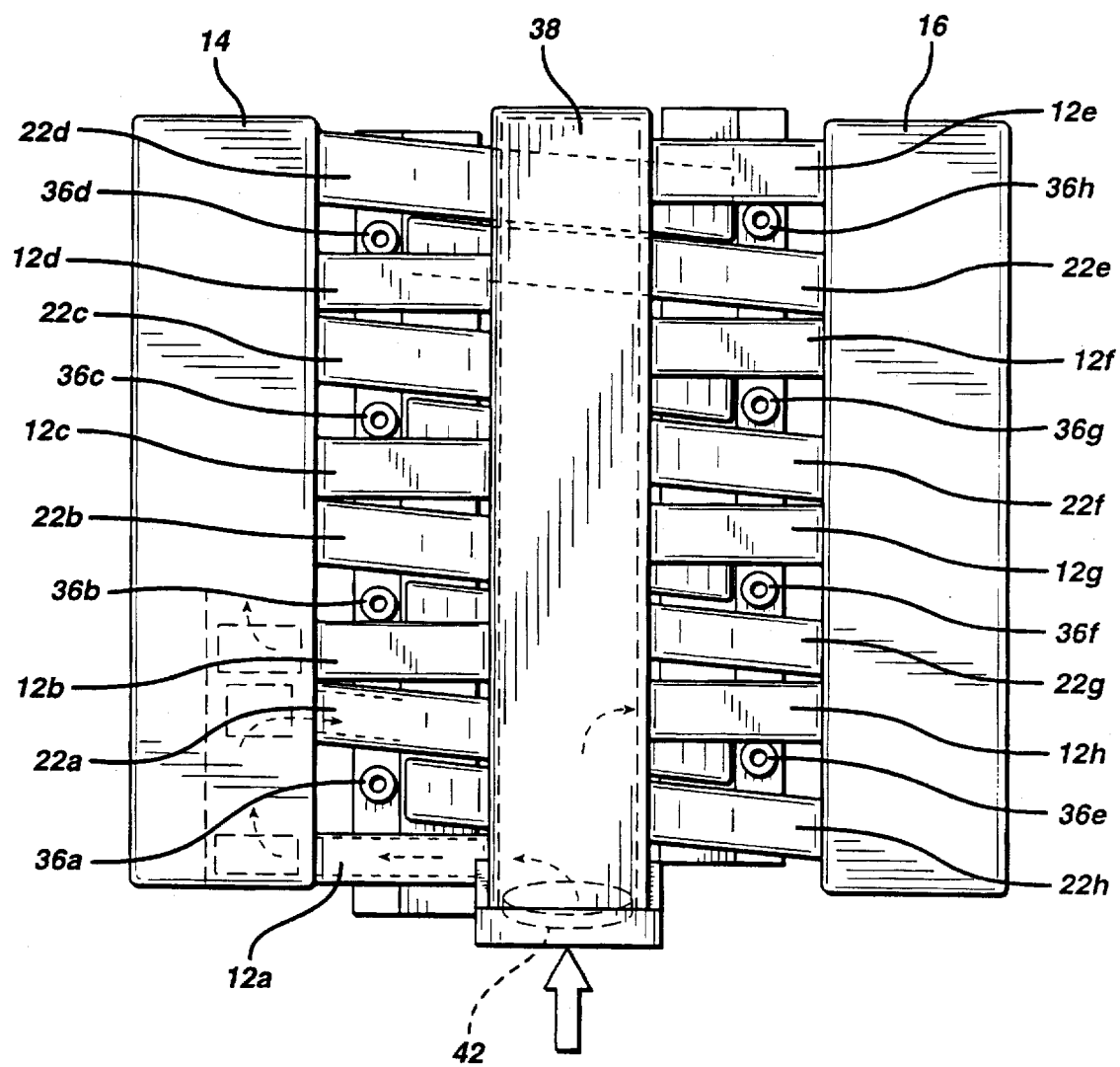
FIG. 4 is a top view of the embodiment of the manifold depicted in FIG. 1.

Referring to FIGS. 1–4, and in particular FIG. 4, a first set of a plurality of substantially parallel, spaced apart, demand runners 22 (a–d) are joined to the first secondary manifold 14 along its length. A second set of a plurality of substantially parallel, spaced apart, demand runners 22 (e–h) are joined to the second secondary manifold 16 along its length. Each demand runner 22 (a–h) extends from its respective secondary manifold 14,16 to a cylinder in the bank 18, 20 opposite the secondary manifold 14,16 from which it extends. The demand runners 22 have unobstructed passages and are in fluid connection with its respective secondary manifold 14,16 and cylinder 26. Eight demand runners 22 are shown. However, any number can be provided depending on the type engine.

It is desirable that all these demand runners, i.e. ram pipes 22 (a–h) be substantially identical to insure uniformity in charging the cylinders 26. It has been found that by shaping the demand runners 22 as shown in FIGS. 1–4, the column of air moving through each demand runner 22 acquires considerable momentum causing the air to ram into the cylinders 26. In addition, it has been found that the length of the demand runners 22 may be tuned to the timing of the intake valves 34 during at least one engine operating condition. When this phenomenon occurs there will be a further increase in the ram effect that will materially add to the charging of the cylinders 26.

The volume of the secondary manifolds 14,16 should be large enough so that air resistance is reduced. The secondary manifolds 14,16 should also be sized to prevent favoring the flow of air into one demand runner to the detriment of another runner. This however is not as critical as in prior art designs due to the nature of this invention.

Referring to the Figures, and in particular FIG. 4, a first set of a plurality of substantially parallel, spaced apart, supply runners or tubes 12(a–d) are provided. These runners 12(a–d) are joined to the first secondary manifold 14 along its length. These runners 12(a–d) are in unobstructed fluid connection with the first secondary manifold 14. A second set of a plurality of substantially parallel, spaced apart, supply runners or tubes 12(e–h) are provided. These runners 12(e–h) are joined to the second secondary manifold 16 along its length. These runners 12(e–h) are in unobstructed fluid connection with the second secondary manifold 16. The supply runners 12 (a–h) are substantially perpendicular to the secondary manifolds 14,16. Preferably, the demand runners 22 (a–h) and the supply runners 12 (a–h) are connected to the first and second secondary manifolds 14,16 such that each pair of adjacent spaced apart supply runners 12 (a–h) has a demand runner 22 (a–h) therebetween.

Figure 5:
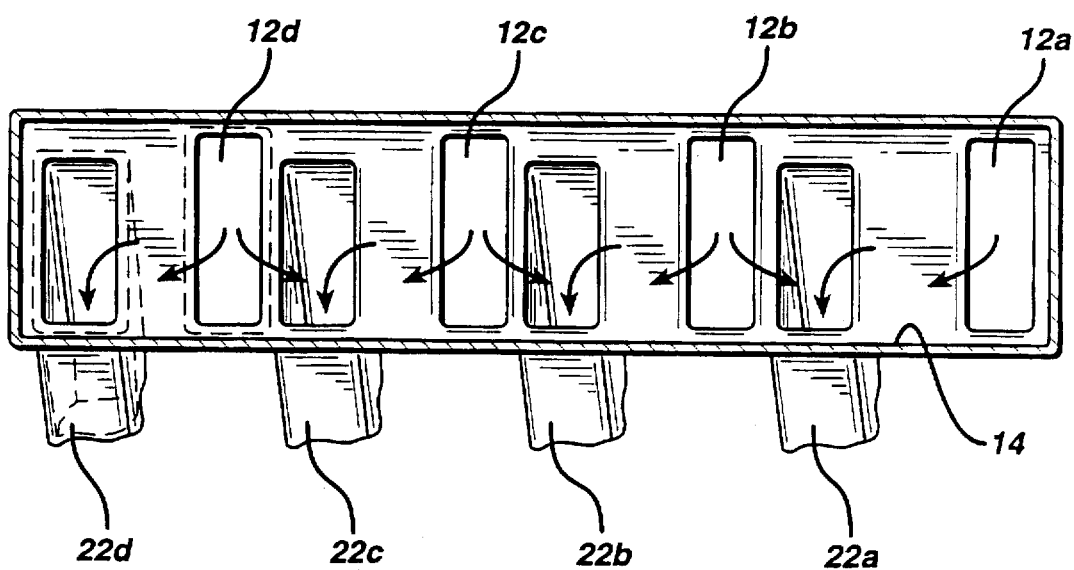
FIG. 5 is a sectional view of the manifold of this invention taken along 5—5 of FIG. 3.

Referring to FIGS. 4 and 5, the demand runners 22 (a–h) and the supply runners 12 (a–h) are connected to the first secondary manifold 14 and the second secondary manifold 16 such that each pair of adjacent spaced apart demand runners 22 (a–h) has a supply runner 12 (a–h) therebetween. For example, supply runner 12a is between demand runners 22a and 22b, supply runner 12b is between demand runners 22b and 22c, supply runner 12c is between demand runners 22c and 22d, supply runner 12e is between demand runners 22e and 22f, supply runners 12f is between demand runners 22f and 22g. Supply runners 12d and 12e are the end supply runners, 12d being at the rear end of the engine 40 and 12e at the front end of the engine 40.

For example, in an engine 40 of the type shown herein there may be two basic firing orders: (1) a six-five firing, where cylinder six (which is charged through demand runner 22b) and cylinder five, (which is supplied by demand runner 22a) are firing sequentially; and (2) three-four firing, where cylinder three (which is charged through demand runner 22g) and cylinder four, (which is supplied by demand runner 22h) are firing sequentially. This invention provides a supply runner 12a and 12g, respectively, between these two sets of demand runners, i.e., 22a, 22b and 22g and 22h. Because there is an additional supply of air provided through, for example 12a and 12g, each cylinder, though they are firing sequentially, receives an adequate supply of air.

Referring to FIGS. 1–4, a primary manifold 38 is provided which is disposed between and parallel to the first and second secondary manifolds 14,16. The primary manifold 38 is in unobstructed fluid connection with each set of supply runners 12 (a–h) which in turn are in unobstructed fluid connection with the first and second secondary manifolds 14,16.

The primary manifold 38 is provided with a centrally located main inlet 42 to which a throttle (not shown) is added. Although this is a preferred embodiment, for example for a Ford type product, optionally the main inlet may be on one side or the other side of the manifold 10, i.e., a secondary manifold is provided with such main inlet. Such a configuration eliminates the need for the primary manifold 38. To provide an air charge to the bank of cylinders on the opposite side of the engine on which the side mounted main inlet is, the supply runners 12 are extended from one secondary manifold to an appropriate location (i.e., between the demand runners)on the opposed secondary manifold to provide an unobstructed fluid connection therebetween. This embodiment is not shown in the Figures. In effect, the manifold system of this invention permits the location of the main inlet to be at any desirable location, e.g., sides, front or back.

It has also been found that the space 28 between the banks of cylinders 18,20 acts as an atmospheric inlet that allows cool air to enter and circulate through the various parts of the manifold 10. This air will thus form an insulating envelope that will be effective to eliminate the transfer of heat from the engine to the manifold substantially. As a result, this prevents heating of the gasoline charge and further improves the volumetric efficiency of the system.

A primary advantage this invention is that the configuration enables the manifold 10 to provide a performance enhancement normally associated with a large, bulky manifold, such as the manifold shown in U.S. Pat. No. 5,000,129 to Fukada et al., while still being able to be housed within the engine compartment of a modern automobile. The trend in modern automobiles is to provide a low hood profile, thereby reducing wind resistance and improving performance.

Additionally, the configuration of the manifold 10 of this invention allows for easy access to the critical parts of the engine without having to remove the manifold. The manifold 10 accomplishes this by means of a unique structure. In particular, in the preferred embodiment depicted, the first and second secondary manifolds 14,16 are not positioned in a vertical plane above the banks 18,20 of cylinders but are positioned at a location further from the center line of the engine 40. The primary manifold 38 is substantially at the same level of the secondary manifolds 14,16. This enables the primary manifold 38 to be connected to the secondary manifolds 14,16 by means of horizontal supply runners 12 which are spaced sufficiently far apart to allow access directly down threw the spaces between the supply runners 12 and demand runners 22 to provide easy access to the injector nozzles 36 and the spark plugs for each cylinder bank. For example, referring to FIG. 4, the location of the fuel injection nozzles 36 at the ends of the demand runners 22 insures, due to the configuration of the manifold 10, easy access to the nozzles 36 from the top or side of the manifold 10. This is due to the fact that the nozzles 36 are in a location between a demand runner 22 and a supply runner 12. For example, referring to FIG. 4, nozzle 36a is at the end of demand runner 22h and between supply runner 12a and demand runner 22a, nozzle 36b is at the end of demand runner 22g and between supply runner 12b and demand runner 22b, nozzle 36c is at the end of demand runner 22f and between supply runner 12c and demand runner 22c, etc.

Further, the horizontal disposition of the supply runners 12 permits the top of the manifold to present a clean, horizontal plane. As can be seen, substantially all of the prior art references require the central manifold to be elevated above the secondary manifolds or secondary manifolds, thus raising the hood line and adding complexity to the manufacturing process by which the manifolds are made.

The manifold 10 of this invention can be made relatively cheaply and is relatively durable because of this simple construction. There are no moving parts, there are no hoses, there are no tubes. The manifold 10 is in effect a rigid body which is placed directly on top of the engine 40. Accordingly, because of the simplicity, the manifold 10 is suitable for retrofitting onto existing engines without fear of exceeding the space envelope requirements normally associated with the engine. This is a surprising and unexpected benefit of this invention which is the direct result of placing the secondary manifolds 14,16 beyond the vertical projection of the cylinder banks 18,20 to obtain an adequately long run for the demand runners 22 from secondary manifolds 14,16 to the cylinders.

In summary, the manifold system 10 of this invention allows air to be supplied to the demand runners 22 in such a fashion that adjacent sequential demanding cylinders, e.g., in a V8 engine cylinders three and four or five and six are isolated from each others air flow demand by balance tubes, i.e., supply runners 12 between the demand runners 22 to the cylinders. The plenums or secondary manifolds 14,16 on either side of the engine 40 also isolate sequential demanding cylinders.

The manifold system 10 of this invention has numerous advantages, in particular:

(A) Allows for large, straight demand runners 22 that enhance air flow.

(B) Isolation of engine heat from the manifold 10.

(C) A low hood profile.

(D) Access to fuel injectors 36 without removal of any other component, directly from above, so you can remove any injector and change it without removing anything else.

(E) Removal of the engine valve covers without removal of the manifold 10, e.g., just pull the whole manifold right off by removing a couple of bolts and a gasket.

(F) The size of the manifold does not exceed the width or length of the engine allowing for better utilization of limited under hood space.

(G) The manifold inherently produces very uniform demand runners 22 allowing for more uniform air/fuel mixture control and lower engine emissions.

(H) The system permits wide latitude in terms of variation of inlet and demand runner lengths, demand runner area and taper which increases the ability of the engine designer to increase volumetric efficiency and horsepower output.

(I) The system allows normally unused space in the vicinity of the valve covers to be used to extend the length of the supply runners to improve engine torque characteristics.

(J) The system allows for isolation of the engine coolant from the manifold to improve charge density.

(K) The system allows a single throttle body to be used to supply both plenum secondary manifolds 14,16 or either side of the engine while maintaining uniform air supply to each plenum, thereby increasing engine output and lowering emissions. For example, an engine that is limited to low 400 horsepower can be increased to 600–700 horsepower.

(L) The system's single air inlet also reduces overall cost as a single mass air meter used in current electronic fuel injection designs can be used.

(M) The system can be manufactured relatively inexpensively by, for example, by the lost metal plastic molding process or by casting and fabrication.

Figure 6:
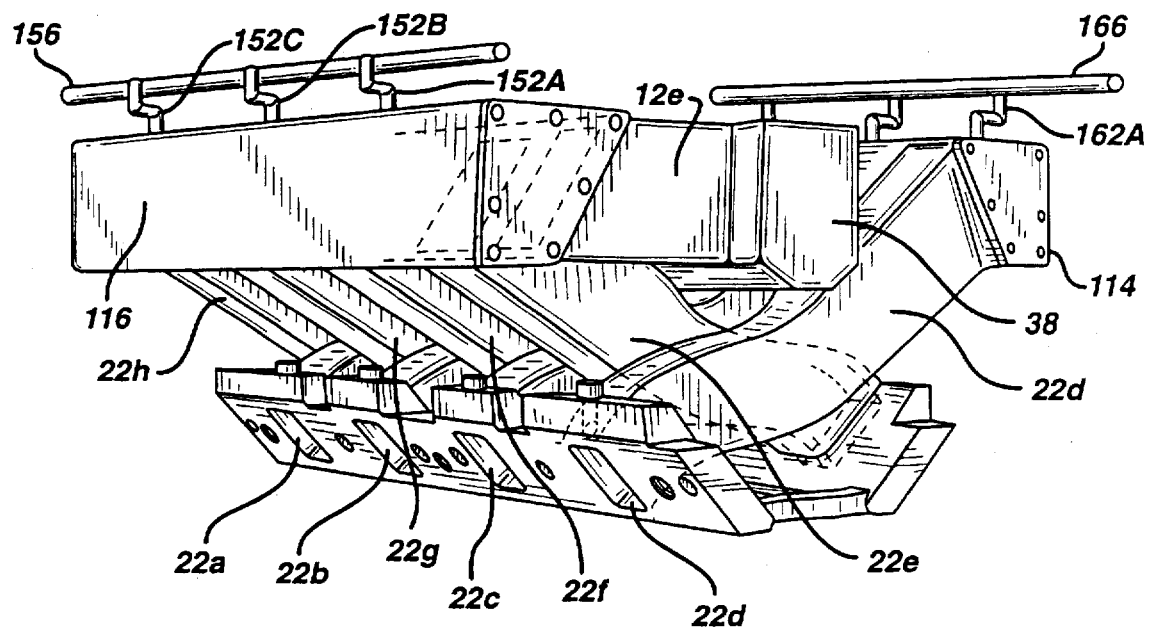
FIG. 6 shows another embodiment of the invention having a different plenum configuration.
Figure 7:
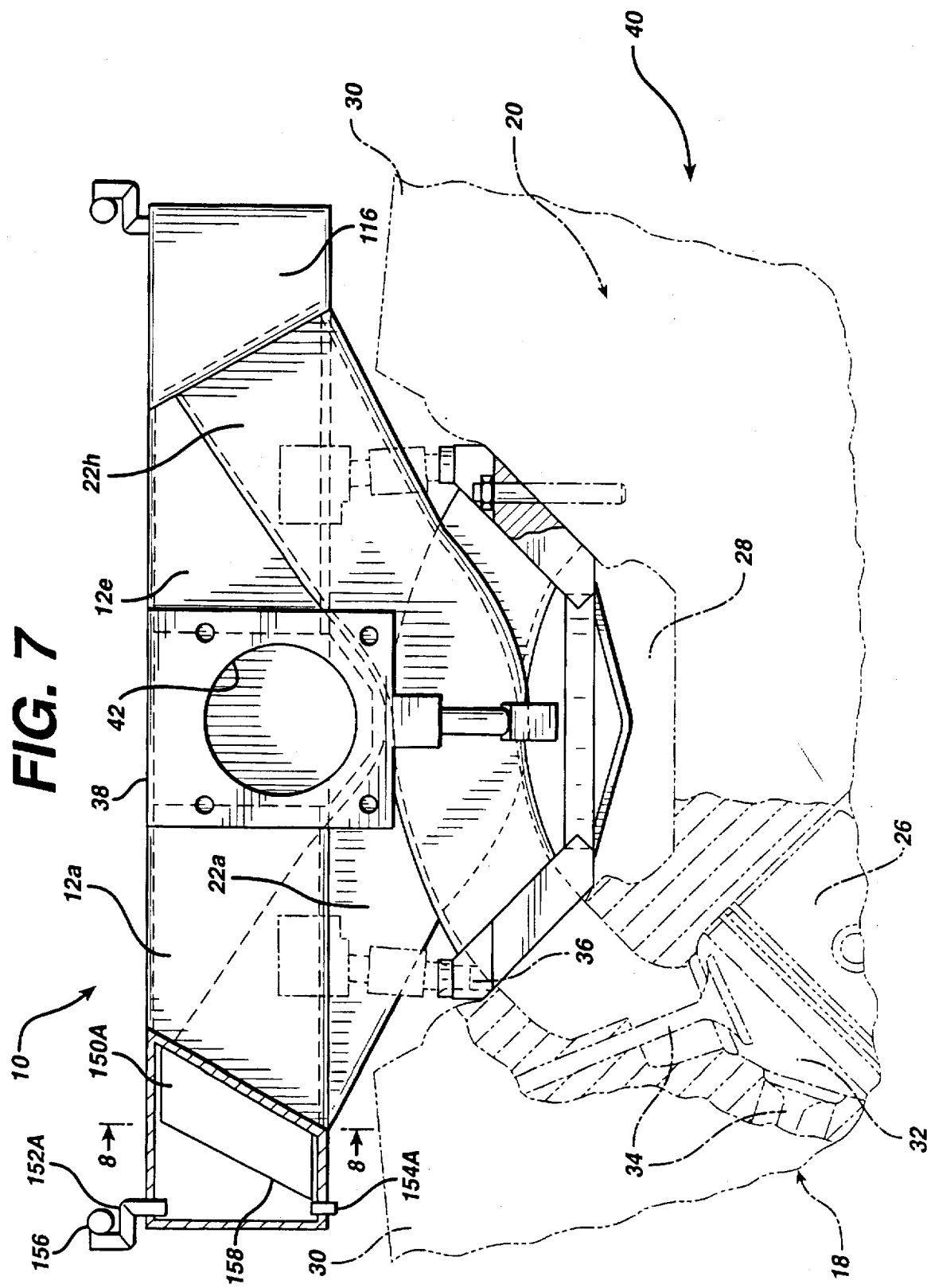
FIG. 7 is a front view of the manifold shown in FIG. 6 showing it mounted on the engine and showing the left most plenum broken away to expose the inside of the plenum.
Figure 8:
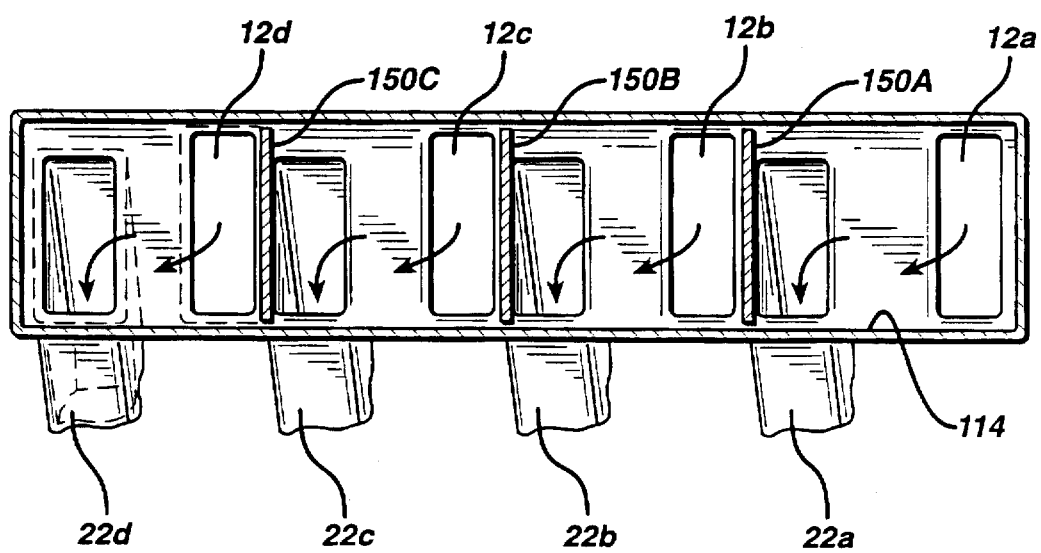
FIG. 8 is a sectional view of the manifold taken along the lines 8—8 of FIG. 7.

Another embodiment of the invention are shown in FIGS. 6, 7, and 8.

In this embodiment, the plenums 114 and 116 are varied. As seen most clearly in FIGS. 7 and 8, within each of the manifolds in this case, manifold 114, in FIG. 8, a series of flapper valves 150a, 150b, and 150c, are positioned within the plenum. These flapper valves are pivotly mounted by means of pins 154a, 154b and 154c extending from the bottom of the flapper valve through the bottom of the plenum and the end of bell cranks 152a, 152b and 152c, respectively, extending through the top of the manifold. The arms of bell crank 152 are actuated by means of an actuator rod 156 for manifold 116 and 166 and manifold 114. Reciprocal movement of the actuating rod 156 will cause rotation of the arm of the bell crank 152a, 152b and 152c in coordination to pivot the bell crank to the lower or closed most position as shown in FIG. 8. In the open position, the end of the flapper valve 152 would be rotated to allow a passage at least as far as the dotted line indicated at 158, but might go substantially further depending upon the amount of rotation that would be used. In the retracted position 128, there is clear communication between all portions of the plenum so that the flow pattern as shown in FIG. 5 would exist with the supply runners sharing demand runners to ensure a uniform and adequate supply of air to the demand runners at a high engine operation. However, in the closed or advanced position as shown in FIG. 8 the flapper valves effectively segment the plenum into four distinct sections, isolating each pair of supply and demand runners. Supply runner 12a would feed demand runner 22a and supply runner 12B with feed demand runner 22b only, etc. The result of this dedication of supply runner to demand runner is to effectively create a single long runner consisting of the length of the supply runner and the demand runner or some length in relation to the overall length of these two runners. The added length has a salutary effect on engine performance at low speed operation of the engine. The added length also results in a change in the effective taper of the demand runner by combining it with the supply runner. This also tends to have a salutary effect on the engine performance at low rpm.

The valve arrangements are actuated in the embodiment shown by means of a valve rod 156 connected to the belt cranks 152 and a valve rod 166 connected to the belt cranks 162. The rod can be actuated by any means well known in the art not shown. So for example, the valve rod itself can be connected to an actuating member that can be controlled pneumatically either by vacuum or by positive air pressure, electrically such as a by a stepper motor or solenoid, or hydraulically by the oil pressure from the engine. Therefore, when employing this valving runner adjusting arrangement, the engine can be either preset to automatically operate or actuate the adjusting process to vary the configuration of the plenum, or it can be done manually if desired by a different set up.

Basically at low rpm the flapper valve would be in place effectively dedicating the supply from a given supply runner to a given demand runner to increase the low end performance of the engine. At the higher rpms where the problems of starvation of individual cylinders become more apparent, the flapper valve would be raised allowing for a sharing of the supply runners to the demand runners to increase the high end performance of the engine.

It should be pointed out that no modifications to the casting of the manifold need be done to incorporate the system of the present invention. The present invention can be retrofit to an existing manifold by merely changing the covers of the plenums which form the actual plenums. Additionally, all of the actuating mechanisms are external to the manifold for easy installation, retrofitting and servicing as necessary. The actuating mechanisms are relatively easy to accomplish and can be any standard or readily available actuating mechanism as mentioned previously. The actuator merely connects to the end of the valve rod with a pivoted or swivel connection so that it can rotate through a given arc to advance the position of the valve rod and therefore raise and lower the flapper valve to produce the dedication of the specific supply runners to demand runners.

Modifications of the foregoing may be made without departing from the spirit and scope of the invention. All such modifications and variations are intended to be included in the present invention as set forth in the appended claims.

What is claimed is:

1. An inlet manifold system for an internal combustion engine having a bank of cylinders, said bank having a plurality of combustion cylinders, the manifold comprising:

a first elongated plenum disposed substantially parallel to and above the bank of cylinders;

a first set of a plurality of substantially parallel, spaced apart demand runners joined to the first plenum along its length, each demand runner extending from the first plenum to a respective cylinder and in fluid connection with the first plenum and the cylinder;

a first set of a plurality of substantially parallel, spaced apart supply runners joined to the first plenum along its length and in fluid connection therewith;

the demand runners and the supply runners connected to the first plenum such that each pair of adjacent spaced apart demand runners has a supply runner therebetween;

valve means disposed in the first plenum operative between a first position and a second position, said valve means operative in the first position to allow communication between the demand runners and the supply runners and operative in the second position to segment the plenum into a series of discrete segments containing a single supply runner and demand runner to cause dedicated flow from a specific supply runner to a specific adjacent demand runner, said valve means comprising:

a plurality of flapper valves, each one of said flapper valves constructed and arranged to pivotably move between said first position and said second position to segment the plenum;

each one of the plurality of flapper valves having a surface contour to conform to a cross-sectional shape of the manifold;

an actuator means constructed and arranged for connection to the plurality of flapper valves to produce synchronous movement for the plurality of flapper valves; and pivot points for the plurality of flapper valves, the pivot points constructed and arranged adjacent to an outer edge of the manifold.

2. An inlet manifold system for an internal combustion engine having a bank of cylinders, said bank having a plurality of combustion cylinders, the manifold comprising:

a first elongated plenum disposed substantially parallel to and above the bank of cylinders;

a first set of a plurality of substantially parallel, spaced apart demand runners joined to the first plenum along its length, each demand runner extending from the first plenum to a respective cylinder and in fluid connection with the first plenum and the cylinder;

a first set of a plurality of substantially parallel, spaced apart supply runners joined to the first plenum along its length and in fluid connection therewith;

the demand runners and the supply runners connected to the first plenum such that each pair of adjacent spaced apart demand runners has a supply runner therebetween; and valve means disposed in the first plenum operative between a first position and a second position, and said valve means operative in the first position to allow communication between the demand runners and the supply runners and operative in the second position to segment the plenum into a series of discrete segments containing a single supply runner and demand runner to cause dedicated flow from a specific supply runner to a specific adjacent demand runner.

3. The inlet manifold system according to claim 2, further comprising:

an actuator means constructed and arranged for connection to said valve means to operate said valve means between said first position and said second position.

4. The inlet manifold system according to claim 3, wherein said valve means comprises:

a plurality of flapper valves, each one of said flapper valves constructed and arranged to pivotably move between said first position and said second position to segment the plenum.

5. The inlet manifold system according to claim 4, wherein the actuator means is constructed and arranged to produce synchronous movement for the plurality of flapper valves.

6. The inlet manifold system according to claim 2, wherein said valve means comprises:

a surface contour to conform to a cross-selectional shape of the manifold.

7. The inlet manifold system according to claim 2, further comprising:

pivot points for the valve means, the pivot points constructed and arranged adjacent to an outer edge of the manifold.

* * * * *